United States Patent [19]

Gschwend

[11] Patent Number: 5,044,851
[45] Date of Patent: Sep. 3, 1991

[54] FASTENING ELEMENT ASSEMBLY AND METHOD OF SETTING FASTENING ELEMENTS

[75] Inventor: Peter Gschwend, Gamprin, Switzerland

[73] Assignee: Hilti Aktiengesellschaft

[21] Appl. No.: 456,331

[22] Filed: Dec. 26, 1989

[30] Foreign Application Priority Data

Dec. 23, 1988 [DE] Fed. Rep. of Germany ....... 3843392

[51] Int. Cl.$^5$ ............................................. F16B 13/06
[52] U.S. Cl. ........................................ 411/44; 411/440
[58] Field of Search ............. 411/44, 45, 29, 19, 411/20, 440, 441; 29/432

[56] References Cited

U.S. PATENT DOCUMENTS

| Re. 13,204 | 2/1911 | Jossart | 411/44 |
|---|---|---|---|
| 2,314,445 | 3/1943 | Rockenfeller et al. | 411/44 |
| 2,761,348 | 9/1956 | Williams et al. | 411/441 |
| 2,921,819 | 1/1960 | Rifkin | 411/44 X |
| 2,960,902 | 11/1960 | DeCaro | 411/440 |
| 3,033,624 | 5/1962 | Biesecker | 411/45 X |
| 3,076,668 | 2/1963 | Famely | 411/44 X |
| 3,205,759 | 9/1965 | Texier | 411/44 |
| 3,428,169 | 2/1969 | Hilti | 411/440 X |
| 3,516,323 | 6/1970 | O'Brien | 411/441 |
| 3,520,225 | 7/1970 | Baugh | 411/19 |
| 4,287,656 | 9/1981 | Gassman et al. | 411/440 X |
| 4,930,963 | 6/1990 | DuVall | 411/44 |

FOREIGN PATENT DOCUMENTS 558111 5/1977 U.S.S.R. ............................ 411/19

Primary Examiner—Robert L. Wolfe
Assistant Examiner—Suzanne L. Dino
Attorney, Agent, or Firm—Toren, McGeady & Associates

[57] ABSTRACT

A fastening element is set in a receiving material, such as concrete, stone and the like, by driving it through the base of a blind borehole previously formed in the receiving material. When the fastening element is driven initially, it moves through a sleeve and expands and secures the sleeve in the blind borehole. Accordingly, the fastening element is fixed in the receiving material and is also secured by the sleeve in the range of the borehole in the receiving material. A fastening element assembly made up of a fastening element and a sleeve can be used.

14 Claims, 1 Drawing Sheet

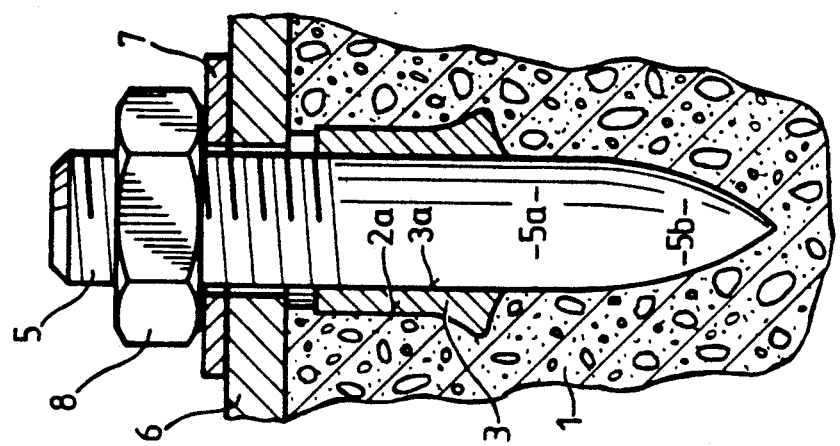
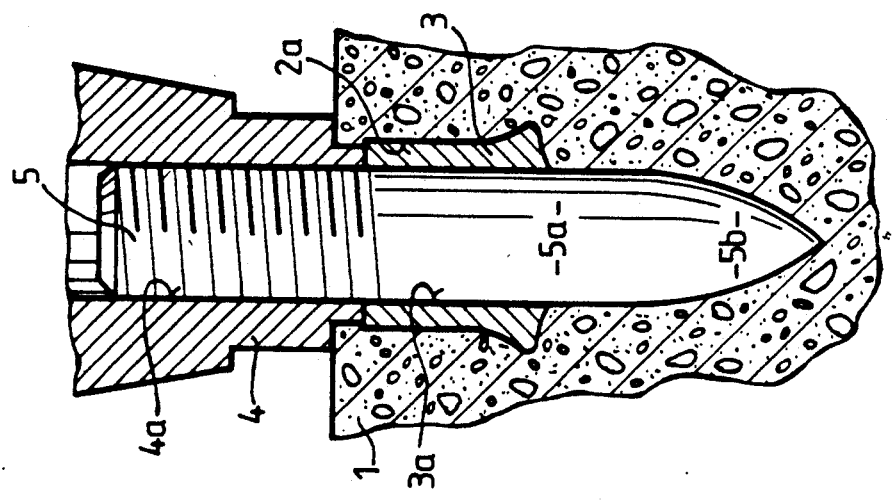
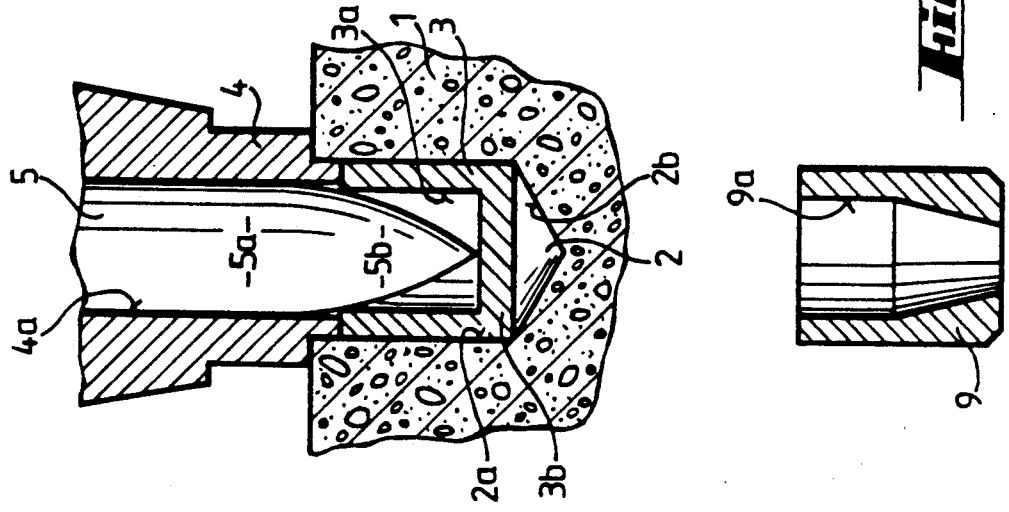

FASTENING ELEMENT ASSEMBLY AND METHOD OF SETTING FASTENING ELEMENTS

BACKGROUND OF THE INVENTION

The present invention is directed to a fastening element assembly and to a method of setting fastening elements, such as bolts and nails in a hard receiving material, such as concrete, stone and the like. Initially, a blind borehole is formed in the receiving material and the fastening element is driven through the base of the borehole into the receiving material. The fastening element is driven by a setting device using highpressure gases.

To set fastening elements in a receiving material, such as concrete, stone and the like, it has been known from U.S. Pat. No. 4,287,656 to drive the fastening elements into the receiving material through the base of a blind borehole previously formed in the receiving material. The fastening element is driven by high- pressure gases developed by the ignition of a explosive powder propelling charge. In this method, known per se, spalling at the surface of the receiving material is prevented and the fastening element can be placed accurately at the desired location.

This method has the disadvantage, however, that the portion of the fastening element projecting through the blind borehole does not contribute to the anchoring value. Accordingly, in comparison to the length of the fastening element extending into the receiving material, only relatively small anchoring values can be obtained. Moreover, with radial play between the fastening element and the bore of the blind borehole, externally introduced transverse forces in the region of the blind borehole of the receiving material are not absorbed or are only partially absorbed. Such a situation can lead to unfavorable loading of the anchored fastening element.

SUMMARY OF THE INVENTION

Therefore, a primary object of the present invention is to provide a method of setting fastening elements in a receiving material, such as stone, concrete and the like, using a setting device operated by high-pressure gases, so that high anchoring values can be achieved while preventing spalling of the receiving material.

In accordance with the present invention, a sleeve is introduced into a blind borehole and the fastening element is driven through the sleeve into the receiving material.

While the fastening element is being driven in, the sleeve guides the fastening element, accompanied by axial support at the base of the borehole, and is expanded radially by the fastening element when designed for such expansion. Accordingly, on one hand, the fastening element is clamped in the sleeve, and, on the other hand, the sleeve is secured in the blind borehole.

Preferably, the sleeve is introduced into the blind borehole as a first step, and the fastening element is driven into the receiving material through the sleeve as a second step. Such a procedure is especially advantageous for serial applications, whereby after producing a series of blind boreholes, the boreholes are fitted with sleeves. Subsequently, the fastening elements can be driven in by a setting device using high-pressure gases. The high-pressure gases operating the setting device, can be produced by igniting explosive powder charges or gas mixtures, moreover, it is possible that the high-pressure gases required to drive the fastening elements, such as compressed air, can be obtained directly from a source.

Furthermore, it is possible to drive the fastening element with the sleeve located in the region of the fastening element leading in the setting direction. Accordingly, the fastening element is driven through the sleeve into the receiving material with the sleeve being driven into the blind borehole. In such an embodiment, separate insertion of the sleeve is not required due to the preassembled arrangement of the sleeve on the fastening element forming a fastening element assembly. In addition, it is unnecessary to provide separate means for holding the sleeve and the fastening element.

The fastening element assembly, made up of the fastening element and the sleeve can be set as a unit using high-pressure gases or the sleeve can be expanded after manual insertion into the blind borehole by subsequently driving the fastening element by means of high-pressure gases.

Preferably, the sleeve is formed of a ductile material, particularly of metal. As an example, aluminum, zinc, magnesium, ferritic steel, austenitic steel and molded articles of sinterable material (for instance, enamel) are suitable. Rustresistant material is preferable to prevent corrosion. Due to the expandable characteristic of the ductile material, the use of certain constructional features such as slots, are not necessary for achieving the expansion of the sleeve.

The blind borehole is advantageously smaller than the diameter of the shank of the fastening element by about 20%. Accordingly, the diameter of the blind borehole receiving the sleeve can correspond to the diameter of the fastening element shank. A reliable clamping and expansion of the sleeve is effected by the fastening element, especially when the diameter of the sleeve bore is smaller than the diameter of the shank of the fastening element, without experiencing excessive stressing of the receiving material, due to pressure.

It is advisable that the greatest stress achieved by the expansion of the sleeve is shifted to the base of the blind borehole. Such a shift is gained by narrowing the bore in the sleeve in the driving direction.

In another embodiment of the sleeve, such shifting of the tension can be obtained by closing the end of the sleeve bore leading in the driving direction. Prior to penetration into the receiving material, the fastening element first penetrates the base of the sleeve. As a result, a radial displacement of the material in the base of the sleeve takes place due to the volume of the fastening element extending through the base into the surface of the receiving material in the bottom of the blind borehole.

The base or closed end of the sleeve has a thickness corresponding to the range of 0.4 to 1 times the outside diameter of the sleeve. Accordingly, a favorable ratio of penetration resistance to clamping effect is insured in the blind borehole.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a sectional view of a blind borehole formed in a receiving material with a sleeve inserted into the borehole and a fastening element held in a setting device and projecting into the sleeve, in accordance with the present invention;

FIG. 2 is a sectional view similar to FIG. 1, however with the fastening element driven into the receiving material;

FIG. 3 is a sectional view similar to FIG. 2 with a completed attachment to the fastening element; and FIG. 4 is a sectional view of another embodiment of the sleeve, in accordance to the present invention.

DETAILED DESCRIPTION OF THE INVENTION

In FIG. 1, a receiving material 1 is shown in the form of a concrete structural part. A blind borehole 2 is formed in the receiving material 1, and the borehole has an axially extending wall 2a and a transversely extending base 2b spaced inwardly from the surface of the receiving material. The sleeve 3 is inserted into the blind borehole 2 and is supported at the base 2b. Sleeve 3 forms an axially extending bore 3a and it is closed adjacent the base 2b of the borehole by a base 3b. The sleeve 3 is formed of a ductile and, preferably, corrosion-proof material. A barrel 4 of a setting device projects at its leading end into the blind borehole 2 and is centrally aligned with the sleeve 3. In this position, the barrel 4 is supported in the axial direction on the surface of the receiving material 1 encircling the opening into the blind borehole 2. A fastening element 5, in the form of a threaded stud, is arranged in a known manner in the barrel bore 4a of the setting device for driving the fastening element into the receiving material. Fastening element 5 has a front or leading end at the lower end in FIGS. 1, 2, and 3 and a trailing end at the upper end in FIGS. 2 and 3. A cylindrical shank 5a extends from the trailing end of the fastening element 5 toward the leading end. The leading end has an ogival tip 5b tapering inwardly from the cylindrical shank 5a and in engagement with the bore 3a in the sleeve adjacent the trailing end of the sleeve. The diameter of bore 3a in the sleeve 3 is approximately 10% smaller than the diameter of the shank 5a.

The arrangement shown in FIG. 1 can be effected by a separate insertion of the sleeve 3 into the blind borehole 2 with a subsequent insertion of the tip 5b of the fastening element 5 into the sleeve 3 by means of the setting device. Moreover, it is possible to insert the sleeve 3 and the fastening element 5 as a unit into the blind borehole 2 by first mounting the sleeve 3 on the tip 5b.

Fastening element 5 is driven into the receiving material 1, as shown in FIG. 2, by the setting device. In the driving procedure, because of the difference in diameter in the sleeve bore 3a and the shank 5a, the fastening element expands and clamps the sleeve 3 in the axial extending region of the sleeve bore 3a within the blind bore hole 2. In addition, the tip 5b of the fastening element initially penetrates the base 3b of the sleeve followed by the shank 5a, which effects a radial displacement of the sleeve material in the region of the base 3b and, accordingly, a positive-locking penetration of the material with the wall 2a of the blind borehole 2. After penetrating the base 3b with the tip 5b and the region of the shaft 5a adjoining the tip, the fastening element 5 penetrates into the receiving material 1 through the base 2b of the blind borehole 2. As a result, on one hand, the fastening element 5 is directly anchored in the receiving material 1 and, on the other hand, is indirectly secured via the sleeve 3.

After the setting procedure is completed, the setting device is removed from the fastening element and a part to be secured, for example, a bracket 6, note FIG. 3, is placed against the surface of the receiving material 1. A washer 7 is placed on the fastening element and a nut 8 is screwed onto the threaded end of the fastening element for securing the bracket, as shown in FIG. 3.

In FIG. 4, another embodiment of a sleeve 9 is illustrated which can be used in place of the sleeve 3, shown in FIGS. 1 to 3. Sleeve 9 has an axially extending bore 9a with the bore 9a being cylindrical from the trailing or upper end of the sleeve to approximately a half-way point. From the halfway point, the bore 9a tapers inwardly to the leading or lower end, as viewed in FIG. 4, to achieve the maximum clamping of the sleeve adjacent the base 2b of the blind borehole 2. The driving-in resistance of the bolt 5 can be reduced as compared to the sleeve embodiment with the base 3b.

While specific embodiments of the invention have been shown and described in detail to illustrate the application of the inventive principles, it will be understood that the invention may be embodied otherwise without departing from such principles.

We claim:

1. Method of setting fastening elements having an axially extending shank, such as bolts, studs and nails, in a hard receiving material, such as concrete, stone and the like, comprising the steps of forming a blind borehole in the receiving material, inserting a sleeve having an axial bore with a diameter into the borehole, and driving the fastening element having an axially elongated shank with a diameter greater than the diameter of said sleeve bore using high-pressure gases through the sleeve into the receiving material and radially expanding said sleeve into the receiving material.

2. Method, as set forth in claim 1, wherein forming the blind borehole with an axial length less than the axial length of the shank, and said sleeve having an axial length of approximately the same axial length of said blind borehole.

3. Method, as set forth in claim 1, wherein inserting the sleeve into the blind borehole and then inserting the fastening element into the sleeve and driving the fastening element through the sleeve into the receiving material.

4. Method, as set forth in claim 1, wherein assembling the sleeve on a leading end of the fastening element, inserting the sleeve and the leading end of the fastening element into the blind borehole, and then driving the fastening element through the sleeve into the receiving material.

5. Method, as set forth in claim 1, wherein forming the sleeve of a ductile material.

6. Method, as set forth in claim 4, wherein forming the sleeve of a metal.

7. Method as set forth in claim 1, wherein forming the bore in the sleeve having the diameter thereof in the range of up to 20% smaller than the diameter of the shank.

8. Method, as set forth in claim 1, wherein forming the bore in the sleeve with at least a portion of the borehole tapering inwardly in the direction of insertion of the fastening element into the borehole.

9. Method, as set forth in claim 1, wherein forming the bore in the sleeve with a closed end facing in the direction of insertion of the fastening element into the receiving material, and driving the fastening element through the closed end into the receiving material.

10. Method, as set forth in claim 9, wherein providing the closed end of the bore in the sleeve with a thickness in the range of 0.4 to 1 times the outside diameter of the sleeve.

11. Fastening element assembly arranged to be set into a blind borehole in a hard receiving material such as concrete, stone and the like, comprising an axially extending fastening element arranged to be driven into the receiving material by high pressure gases, said fastening element having an axially extending shank, said shank having a first end and a second end, said shank having a diameter extending from the second end toward the first end, said shank adjacent the first end tapering inwardly from said diameter to the first end, an axially extending sleeve to be inserted into the borehole in the receiving material having an axially extending bore therein, said sleeve having a first end and a second end with the bore extending from the second end toward the first end thereof and with said second end arranged to receive the first end of said shank so that by applying high pressure gases to the second end of said fastening element, said fastening element can be driven through said sleeve out of the first end thereof into the receiving material, and said sleeve having a bore diameter at the second end thereof smaller than the diameter of said shank whereby said fastening element expands said sleeve against the receiving material.

12. Fastening element assembly, as set forth in claim 11, wherein said fastening element having an ogival tip at the first end thereof.

13. Fastening element assembly, as set forth in claim 12, wherein said sleeve has a base closing said bore at the first end thereof.

14. Fastening element assembly, as set forth in claim 12, wherein the bore in said sleeve has a cylindrically shaped section extending from the first end thereof and a conically shaped section tapering inwardly from said cylindrical section to the first end thereof and the sleeve being open at the first end.

* * * * *